US008287764B2

(12) United States Patent
Van Lare et al.

(10) Patent No.: US 8,287,764 B2
(45) Date of Patent: Oct. 16, 2012

(54) COATED PARTICLES

(75) Inventors: Cornelis Elizabeth Johannus Van Lare, Wijchen (NL); Auke Gerardus Talma, Bathmen (NL); Hendrika Petronella Maria Verlaan-Hooft, Soest (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 13/055,398

(22) PCT Filed: Jul. 20, 2009

(86) PCT No.: PCT/EP2009/059272
§ 371 (c)(1),
(2), (4) Date: Jan. 21, 2011

(87) PCT Pub. No.: WO2010/010052
PCT Pub. Date: Jan. 28, 2010

(65) Prior Publication Data
US 2011/0133128 A1    Jun. 9, 2011

Related U.S. Application Data

(60) Provisional application No. 61/083,445, filed on Jul. 24, 2008.

(30) Foreign Application Priority Data

Jul. 22, 2008    (EP) .................................... 08160870

(51) Int. Cl.
*C09K 3/00* (2006.01)
*C23F 11/00* (2006.01)
*C07F 5/06* (2006.01)

(52) U.S. Cl. ................ 252/389.23; 106/632; 252/389.1; 252/389.2; 252/389.5; 252/389.52; 252/389.53; 252/389.61; 423/420.2; 423/600; 501/141; 502/80; 556/179

(58) Field of Classification Search ............. 252/389.23, 252/389.1, 389.2, 389.5, 389.52, 389.53, 252/389.61, 315.5; 427/220, 221, 242; 428/403, 428/407, 404; 525/200; 556/179; 106/632; 423/420.2, 600; 501/141; 502/80
See application file for complete search history.

(56) References Cited

U.S. PATENT DOCUMENTS
2004/0229987 A1    11/2004    Kobayashi et al.
2007/0161727 A1*    7/2007    Kobayashi et al. ........... 524/200

FOREIGN PATENT DOCUMENTS

| EP | 1803801 | | 7/2007 |
|---|---|---|---|
| GB | 2415695 | | 1/2006 |
| JP | 03-153767 | * | 7/1991 |
| JP | 3153767 | | 7/1991 |
| JP | 2001-234090 | * | 8/2001 |
| JP | 2001234090 | | 8/2001 |
| WO | 00/09599 | | 2/2000 |
| WO | 2006/002954 | | 1/2006 |
| WO | 2007/065859 | | 6/2007 |
| WO | 2007/065877 | | 6/2007 |

OTHER PUBLICATIONS

J.K. Lin, C.L. Hsia and J.Y. Uan, Characterization of Mg,Al-hydrotalcite conversion film on Mg alloy and Cl- and CO2-3 anion-exchangeability of the film in a corrosive environment, Scripta Materialia 56 (2007) 927-930, 2007 Acta Materialia Inc. Published by Elsevier Ltd. All rights reserved.*
Othman et al.: "Mg-Al hydrotalcite coating on zeolites for improved carbon dioxide adsorption", Chemical Engineering Science, Oxford, GB, vol. 61, No. 5, Mar. 1, 2006, pp. 1555-1560, XP005247996.
Del Arco et al: "Release studies fo different NSAIDs encapsulated in Mg, Al, Fe-hydrotalcites", Applied Clay Science, Jan. 2009 Elsevier, vol. 42, No. 3-4, Jul. 3, 2008, pp. 538-544, XP002506641.
Del Hoyo et al: "Layered double hydroxides and human health: An overview", Applied Clay Science, Elsevier Science, NL, vol. 36, No. 1-3, Mar. 16, 2007, pp. 103-121, X005932581.
Cavani et al.: "Hydrotalcite-Type Anionic Clays: Preparation, Properties and Applications", Catalysis Today, 11 (1991), pp. 173-301, Elsevier Science Publishers, B.V., Amsterdam.
Bookin et al.: "Polytype diversity of the hydrotalcite-like minerals II. Determination of the polytypes of experimentally studied varieties", Clays and Clay Minerals, vol. 41, No. 5, pp. 558-564.
Carlino, Simon: "The Intercalation of Carboxylic Acids into Layered Double Hydroxides: a Critical evaluation and review of the different methods", Solid State Ionics, vol. 98 (1997), pp. 73-84.
Pickering, S.U.: "Emulsions", J. Chem. Soc. 91 (1907), pp. 2001-2021.
International Search Report and Written Opinion, PCT/EP2009/059272, mailed Sep. 9, 2009, 11 pages.
International Preliminary Report on Patentability, PCT/EP2009/059272, issuance date Jan. 25, 2011, 6 pages.

* cited by examiner

*Primary Examiner* — Bijan Ahvazi
(74) *Attorney, Agent, or Firm* — Timothy D. Meade

(57) ABSTRACT

The invention relates to coated particles comprising a core material and a shell and wherein said core material is an organic compound and wherein said shell comprises a layered double hydroxide comprising a hydroxide or an organic anion as charge-balancing anion.

14 Claims, No Drawings

COATED PARTICLES

REFERENCE TO RELATED APPLICATION(s)

This application is the U.S. National Phase of PCT/EP2009/059272 filed on Jul. 20, 2009, and claims the benefit of U.S. Provisional Application No. 61/083,445 filed on Jul. 24, 2008.

The invention relates to coated particles, to processes to produce said coated particles, and to the use of layered double hydroxides to coat particles.

The term "coated particles" as used throughout this application is meant to denote particles which have been encapsulated. These particles comprise a material (the core material) with a porous skin (the shell) on the outer surface.

Small organic compounds are added to water-borne or solvent-borne coating compositions or polymeric matrices for various reasons, e.g. as self-healing compounds, anti-corrosion agents, phase transfer materials, herbicides, pesticides, and the like. If these compounds are not water-compatible or not compatible with the coating composition or polymeric matrix in which they are to be used, it is necessary to modify these particles in one way or another to increase their compatibility. Furthermore, it is often desirable to regulate their release. Small hygroscopic particles are difficult to handle and it is desirable to protect them from taking up water. Hence, for a variety of reasons, there is a need to, temporarily, package up small organic particles.

M. del Arco et al. describe in *Applied Clay Science* 42 (2009), 538-544, a way to temporarily package up drugs by intercalating them in their anionic form in Mg, Al, Fe-hydrotalcites. Not only are these systems difficult to prepare (it is not easy to get the drug in the interlayer space of the layered double hydroxide), but it has been found that these drugs will be released only very slowly.

Encapsulation is a technique frequently used in the art to package up particles. Encapsulation can for instance modify the colour, shape, volume, apparent density, reactivity, durability, pressure sensitivity, heat sensitivity, and photosensitivity of the encapsulated compound(s). Encapsulated particles have many useful functions and have been employed in many different areas, frequently connected with applications in which the contents of the capsule have to be released into the surrounding environment under controlled conditions. Encapsulating compounds which are solidified makes it possible for example to increase the storage life of a volatile compound. Further, the core material in encapsulated compounds can be protected from the effects of UV rays, moisture, and oxygen. Chemical reactions between two active species can be prevented by physical separation due to encapsulation and, finally, finely divided powders can be encapsulated to reduce agglomeration problems.

In various publications, for instance in EP 1803801, WO 2006/002954, and GB 2415695, hygroscopic chelates are coated with polymeric materials such as polyethylene glycol and polyvinyl pyrrolidone. These polymeric materials, however, difficult to dissolve in e.g. water. As a consequence, coating has to be performed using highly diluted systems. Having to get rid of the large quantities of solvent makes this technique an expensive one. The resulting coated materials have a reduced water uptake.

The object of the present invention is to provide coated particles in which the organic compound is separated from the environment by a suitable shell which makes the organic compound compatible with the systems wherein it is to be used but which is porous to a certain extent, so that the organic material will be released. This is for example desired to control the reactivity of a compound, to regulate its release, or to protect a hygroscopic particle from taking up water. Another object of the present invention is to provide an encapsulation method which is relatively cheap and easily applicable to various organic compounds.

This objective is achieved by providing coated particles wherein a specific layered double hydroxide is used to form a shell around a core material. Thus, the invention relates to coated particles comprising a specific layered double hydroxide (also denoted as LDH). LDHs which can be used according to the present invention have a layered structure corresponding to the general formula:

$$[M_m^{2+}M_n^{3+}(OH)_{2m+2n}]X_{n/z}^{z-}.bH_2O \qquad (I)$$

wherein $M^{2+}$ is a divalent metal ion such as $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, $Mg^{2+}$, $M^{3+}$ is a trivalent metal ion such as $Al^{3+}$, $Cr^{3+}$, $Fe^{3+}$, $Co^{3+}$, $Mn^{3+}$, $Ni^{3+}$, $Ce^{3+}$, and $Ga^{3+}$, m and n have a value such that m/n=1 to 10, and b has a value in the range of from 0 to 10. X is hydroxide or an organic charge-balancing anion which is a linear or branched, saturated or unsaturated $C_1$-$C_{18}$ alkyl chain optionally comprising one or more functionalities selected from the group consisting of carboxylic acid, hydroxyl, thiol, and amine, and optionally comprising a functional group on the alkyl chain selected from the group consisting of ester, ether, chloride, bromide, thioether, sulfonium, phosphonium, phosphinic, and isocyanate.

If X is an organic anion, it is denoted throughout this description as "a charge-balancing organic anion". This term refers to organic ions that compensate for the electrostatic charge deficiencies of the crystalline clay sheets of the LDH. As the clay typically has a layered structure, the charge-balancing organic ions may be situated in the interlayer, on the edge or on the outer surface of the stacked clay layers. Such organic ions situated in the interlayer of stacked clay layers are referred to as intercalating ions.

Such a stacked clay or organoclay may also be delaminated or exfoliated, e.g. in a polymer matrix. Within the context of the present specification, the term "delamination" is defined as reduction of the mean stacking degree of the clay particles by at least partial de-layering of the clay structure, thereby yielding a material containing significantly more individual clay sheets per volume. The term "exfoliation" is defined as complete delamination, i.e. disappearance of periodicity in the direction perpendicular to the clay sheets, leading to a random dispersion of individual layers in a medium, thereby leaving no stacking order at all.

Swelling or expansion of the clays, also called intercalation of the clays, can be observed with X-ray diffraction (XRD), because the position of the basal reflections—i.e. the d(00l) reflections—is indicative of the distance between the layers, which distance increases upon intercalation.

Reduction of the mean stacking degree can be observed as broadening, up to disappearance, of the XRD reflections or by an increasing asymmetry of the basal reflections (00l).

Characterization of complete delamination, i.e. exfoliation, remains an analytical challenge, but may in general be concluded from the complete disappearance of non-(hk0) reflections from the original clay.

The ordering of the layers and, hence, the extent of delamination, can further be visualized with transmission electron microscopy (TEM).

In one embodiment of the invention, the layered double hydroxide has a layered structure corresponding to the general formula:

$$[Mg_m^{2+}Al_n^{3+}(OH)_{2m+2n}]X_{n/z}^{z-}.bH_2O \qquad (II)$$

wherein m and n have a value such that m/n=1 to 10, preferably 1 to 6, more preferably 2 to 4, and most preferably a value close to 3; b has a value in the range of from 0 to 10, generally a value of 2 to 6, and often a value of about 4. X is an organic charge-balancing ion as defined above. It is preferred that m/n should have a value of 2 to 4, more particularly a value close to 3.

The LDH may have any crystal form known in the art, such as described by Cavani et al. (*Catalysis Today*, 11 (1991), pp. 173-301) or by Bookin et al. (*Clays and Clay Minerals*, (1993), Vol. 41(5), pp. 558-564), such as $3H_1$, $3H_2$, $3R_1$, or $3R_2$ stacking.

The distance between the individual clay layers in the LDH generally is larger than the distance between the layers of an LDH that contains only carbonate as charge-balancing anion. Preferably, the distance between the layers in an LDH according to the invention is at least 1.0 nm, more preferably at least 1.1 nm, and most preferably at least 1.2 nm. The distance between the individual layers can be determined using X-ray diffraction, as outlined before.

Suitable organic anions include the organic anion derived from acrylate, methacrylate, epoxy, vinyl, and carbamate. A preferred organic anion is the anion derived from glycine.

If such organically modified LDHs are used in polymeric matrices, these functional groups may interact or react with the polymer.

Preferably, the LDH comprises a monovalent charge-balancing anion comprising at least one hydroxyl group, which because of its polarity and compatibility with water results in the desired easy delamination and/or exfoliation of the LDH. The monovalent charge-balancing anion may comprise one hydroxyl group, two hydroxyl groups or three or more hydroxyl groups. A monovalent anion comprising one or two hydroxyl groups is preferred. Most preferably, also for reasons of good polarity and compatibility with water, the monovalent charge-balancing anion is a monocarboxylate. Examples of monocarboxylates which are in accordance with the present invention include aliphatic monocarboxylates such as glycolate, lactate, 3-hydroxypropanoate, α-hydroxybutyrate, β-hydroxybutyrate, γ-hydroxybutyrate, 2-hydroxy-2-methylbutyrate, 2-hydroxy-3-methyl butyrate, 2-ethyl-2-hydroxybutyrate, 2-hydroxycaproate, 2-hydroxyisocaproate, 10-hydroxydecanoate, 10-hydroxy-dodecanoate, dimethylol propionate, and aromatic or phenyl-containing monocarboxylates such as 4-hydroxyphenyl pyruvate, 3-fluoro-4-hydroxyphenyl acetate, 3-chloro-4-hydroxyphenyl acetate, homovanillate, 3-hydroxy-4-methoxymandelate, DL-3,4-dihydroxymandelate, 2,5-dihydroxyphenyl acetate, 3,4-dihydroxyphenyl acetate, 3,4-dihydroxyhydrocinnamate, 4-hydroxy-3-nitrophenyl acetate, 2-hydroxycinnamate, salicylate, 4-hydroxybenzoate, 2,3-dihydroxybenzoate, 2,6-dihydroxybenzoate, 3-hydroxyanthranilate, 3-hydroxy-4-methyl benzoate, 4-methyl salicylate, 5-methyl salicylate, 5-chlorosalicylate, 4-chlorosalicylate, 5-iodosalicylate, 5-bromosalicylate, 4-hydroxy-3-methoxy-benzoate, 3-hydroxy-4-methoxybenzoate, 3,4-dihydroxybenzoate, 2,5-dihydroxybenzoate, 2,4-dihydroxybenzoate, 3,5-dihydroxybenzoate, 2,3,4-trihydroxybenzoate, gallate, and syringate. Preferred monocarboxylates are selected from the group consisting of glycolate, lactate, dimethylol propionate, gluconate, and salicylate. Lactate and dimethylol propionate are even more preferred monocarboxylates.

It is noted that some of the above monocarboxylates may exist in both the D and the L-form. It is contemplated to use either of the enantiomers in the LDH of the invention, or to use mixtures of the enantiomers.

It is further envisaged to use two or more of the above monovalent charge-balancing anions, in particular the monocarboxylates, as charge-balancing anions.

The LDH according to the invention can be prepared in analogous manner to known methods for the preparation of prior art organoclays. Examples of such methods for LDHs can be found in WO 00/09599, WO 2007/065877, and in WO 2007/065859.

Suitable methods for the preparation of the organoclay according to the invention include:
a. ion exchange with the organic ions;
b. synthesis of the clay in the presence of the organic ions;
c. calcination of the clay and subsequent rehydration in the presence of the organic ions;
d. exchange of carbonate ions of the clay with a mineral acid and subsequent ion exchange with the organic ions.

For further methods reference is made to Carlino (*Solid State Ionics*, 1996, 98, pp. 73-84). In this article, methods such as the thermal or melt reaction method and the glycerol-effected exchange method are described. According to the thermal or melt reaction method, LDH and the mixture of organic anions are intimately mixed at elevated temperature, preferably at a temperature above the melting temperature of the organic anion with the highest melting temperature. According to the glycerol-effected exchange method, there is intermediate swelling with glycerol of the LDH, after which the mixture of organic anions is introduced and subsequent intercalation takes place. It is noted that this method can also be carried out using swelling agents other than glycerol, such as ethanol, 2-ethoxypropanol, 2-propanol, butanol, triethylene glycol, etc. Alternatively, the LDH of the invention can be prepared by melt blending the charge-balancing anions and clay.

The compound that can be encapsulated with the LDH according to the present invention, which is denoted as core material throughout this description, can be any organic compound which can be encapsulated using conventional encapsulation techniques, i.e. any organic compound you would like to, temporarily, package up. The term "organic compound" as used throughout the description does not include polymers. Suitable compounds include chelating agents, hygroscopic compounds, anti-corrosion agents, self-healing compounds, herbicides, pesticides, fungicides, biocides, active pharmaceutical ingredients, medicines, phase change materials, sulfur ($S_8$), rubber additives, UV-stabilizers, epoxies, isocyanates, amines, and the like. Preferably, the core material is selected from the group consisting of glutamic acid, diacetic acid (GLDA), benzotriazole (BT), mercaptobenzothiazole, dimethylolpropionic acid (DMPA), and methylglycine diacetic acid (MGDA).

Use of the LDH according to the present invention to encapsulate these compounds has the following advantages. For example, in the case of hygroscopic compounds, such as hygroscopic chelates, water uptake is considerably reduced, keeping the coated particles free flowing and storable for a longer period of time than conventional coated hygroscopic compounds, while allowing good dispersion and dissolution in an aqueous medium. Furthermore, compounds such as corrosion inhibitors, catalysts, or UV-stabilizers can be protected from the solvent or the matrix into which said compounds are to be incorporated. Medicines, herbicides, fungicides, or pesticides will thus be released to the environment in a controlled manner.

The use of LDHs as encapsulating compounds is particularly advantageous because such compounds are relatively cheap and easily prepared, and encapsulation using LDHs is less laborious than conventional encapsulation methods. Further, LDHs are generally applicable as encapsulating agents. Moreover, as described above, LDHs can be easily modified by changing the charge-balancing anion so that it contains a functionality which increases compatibility with the medium into which the coated particles are to be incorporated, such as solvents or polymeric matrices. Most preferred is the use of exfoliated LDHs which make the core material compatible with aqueous systems such as water-borne coating compositions.

Finally, the thickness of LDHs is tunable by varying the ratio between the core compound and the LDH. The permeability of the shell is tunable by functionalizing the shell. It is also possible to have a shell comprising different layers, e.g. a layer comprising LDH and a second or even further layer comprising a conventional encapsulating agent. Any combination of layers is possible.

The invention further pertains to processes for preparing the coated particles. More particularly, the coated particles can be prepared via any encapsulation technique available in the art, but preferably by using a Pickering emulsion, using a spray-drying technique, or using a fluid bed.

In a first embodiment, the coated particles are prepared using a Pickering emulsion. A Pickering emulsion is an emulsion that is stabilized by solid particles instead of surfactant molecules. Pickering emulsions require sufficiently small particles which adsorb onto the interface between two phases. This means that the solid particles usually are at least 10-fold smaller in size than the dispersed droplets of the emulsion. This type of emulsion was named after its discoverer, S. U. Pickering, who first described the phenomenon in 1907: S. U. Pickering, "Emulsions", *J. Chem. Soc.* 91 (1907) 2001. If the product to be encapsulated and the solvent are mixed and small droplets are formed and dispersed throughout the solvent, eventually the droplets will coalesce to decrease the amount of energy in the system. However, if solid particles are added to the mixture, they will bind to the surface of the interface and prevent the droplets from coalescing, thus causing the emulsion to be more stable. The process to prepare coated particles according to the present invention using a Pickering emulsion comprises the following steps:
(a) providing a mixture of a compound to be encapsulated and a solvent;
(b) heating and stirring the resulting mixture;
(c) cooling the mixture and separating the particles from the mixture;
(d) drying the mixture, below the melting point of the mixture, to obtain the coated particles;
wherein a layered double hydroxide is added to the mixture during step (a) and/or step (b).

In another embodiment, the coated particles are prepared using a spray-drying technique. Spray-drying is a commonly used method of drying a liquid feed through a hot gas. In that case the process comprises the following steps:
(a) providing a mixture of a compound to be encapsulated and a solvent;
(b) optionally heating and stirring the mixture;
(c) spray-drying the mixture, below the melting point of the mixture, to obtain the coated particles;
wherein a layered double hydroxide is added to the mixture during step (a) and/or step (b).

In yet another embodiment, the coated particles are prepared by spraying the LDH on the particle using a fluid bed coating process (J. R. Howard, *Fluidized Bed Technology Principles and Applications*, New York, N.Y.: Adam Higler (1989)). The fluidized bed coating process is a simple dipping process that can be either conventional or electrostatic. In the conventional fluidized bed process, the fluidized bed is a tank with a porous bottom plate. The plenum below the porous plate supplies low pressure air uniformly across the plate. The process comprises the following steps:
(a) a compound to be encapsulated in the form of a powder is fluidized with air at an air inlet temperature below the melting temperature of the powder;
(b) a coating liquid comprising a layered double hydroxide is sprayed onto the powder via a nozzle.

Using the above-described fluidized bed coating process, coated particles are prepared typically having a size of at least 100 μm or larger in one dimension. Using the above-described spray-drying technique, preferably coated particles are prepared having a size of between 5 nm and 20 μm in one dimension. Such small particles, which are preferred in the described applications, can be prepared by adjusting the spray nozzle and spraying conditions, as known to the skilled person.

In all of the above uses as encapsulating agent, the LDH is preferably present in the coated particles in an amount of at least 5 wt %, preferably at least 10 wt %, and most preferably at least 15 wt %, and at most 70 wt %, preferably at most 60 wt %, and most preferably at most 50 wt %, based on the total weight of the dry coated particles.

The invention further pertains to a suspension comprising the coated particles of the invention and a continuous phase. The continuous phase can be any suitable liquid wherein the coated particles can be dissolved or suspended. In one embodiment of the invention, the coated particles do not dissolve in the continuous phase but are suspended therein. The amount of coated particles is generally at least 0.1 wt %, preferably at least 0.2 wt %, and most preferably at least 0.5 wt %, and at most 40 wt %, preferably at most 25 wt %, and most preferably at most 20 wt %, based on the total weight of the suspension.

In one embodiment of the invention, the continuous phase is water or a mixture of water and a water-miscible solvent. The miscibility of the solvent with water can be determined using ASTM D 1722-98. Examples of such solvents include alcohols such as methanol, ethanol, n-propanol, isopropanol, n-butanol, i-butanol, and tert-butanol; alkane polyols such as ethylene glycol, propylene glycol, and glycerol; ethers such as dimethyl ether, diethyl ether or dibutyl ether; diethers of alkane polyols such as dimethylethylene glycol, diethylethylene glycol, dimethylpropylene glycol, and diethylpropylene glycol; ketones; alkoxylated alcohols according to the formula

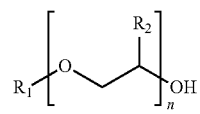

wherein $R_1$ is a $C_1$-$C_8$ alkyl or phenyl, $R_2$ is hydrogen or methyl, and n is an integer from 1 to 5; amines such as triethyl amine; non-ionic polymeric solvents such as polyethylene glycols, polypropylene glycols, lauryl polyethylene glycol; ionic liquids; pyridines; dimethyl sulfoxide; dimethyl formamide, and pyrrolidones such as n-methylpyrrolidone. Also mixtures of two or more water-miscible solvents are envisaged. It is preferred that the suspending medium comprising both water and a water-miscible solvent does not segregate and form two layers.

It is also envisaged to use a suspending medium in which water is absent.

In a preferred embodiment of the invention, LDH is used as an encapsulant for highly hygroscopic coated particles such as chelates like glutamic acid diacetic acid (GLDA) or its tetra-sodium salt, and methylglycine diacetic acid (MGDA). Such encapsulation renders coated particles which are free-flowing and which can be transported and stored for a prolonged period of time without water being adsorbed by the coated particles. Furthermore, coated particles wherein chelates are coated with LDH will retain said chelate longer if it starts to melt. Still, the chelate will be released sufficiently fast. An LDH can also have an additional functionality in the application, such as anionic binding capacity.

The coated particles of the invention can be used as a constituent in coating compositions, (printing) ink formulations, adhesive tackifiers, resin-based compositions, rubber compositions, cleaning formulations, drilling fluids and cements, asphalt, plaster formulations, non-woven fabrics, fibres, foams, membranes, orthoplastic casts, (pre-)ceramic materials, and hybrid organic-inorganic composite materials such as polymer-based nanocomposites. The coated particles of the invention can further be used in polymerization reactions such as solution polymerization, emulsion polymerization, and suspension polymerization. The coated particles of the invention can further be used in applications where the separate functions of the coated particles and the organic anions may be combined, such as in the paper making process or the detergent industry. Additionally, the coated particles of the invention can be used in controlled release applications for medicines, pesticides, and/or fertilizers, and as sorbent of organic compounds such as pollutants, colorants, and anionically charged molecules, etc.

The invention further pertains to composite materials comprising a polymeric matrix and the coated particles according to the invention. Composite materials are engineered materials made from two or more constituent materials with significantly different physical or chemical properties and which remain separate and distinct on a macroscopic level within the finished structure. A polymer matrix is a range of any of numerous natural and synthetic compounds of usually high molecular weight consisting of up to millions of repeated linked units, each a relatively light and simple molecule.

The polymer that can be suitably used in the composite material of the invention can be any polymer matrix known in the art. In this specification, the term "polymer" refers to an organic substance of at least two building blocks (i.e. monomers), thus including oligomers, copolymers, and polymeric resins. Suitable polymers for use in the polymer matrix are both poly-adducts and polycondensates. The polymers may further be homopolymers or copolymers. Preferably, the polymeric matrix has a degree of polymerization of at least 20, more preferably of at least 50. In this connection, for a definition of the degree of polymerization reference is made to P. J. Flory, *Principles of Polymer Chemistry*, New York, 1953.

Examples of suitable polymers are polyolefins, such as polyethylene or polypropylene, vinyl polymers, such as polystyrene, polymethyl methacrylate, polyvinyl chloride, polyvinylidene chloride or polyvinylidene fluoride, saturated polyesters, such as polyethylene terephthalate, polylactic acid, or poly(ε-caprolactone), unsaturated polyester resins, acrylate resins, methacrylate resins, polyimides, epoxy resins, phenol formaldehyde resins, urea formaldehyde resins, melamine formaldehyde resins, polyurethanes, polycarbonates, polyaryl ethers, polysulfones, polysulfides, polyamides, polyether imides, polyether esters, polyether ketones, polyetherester ketones, polysiloxanes, polyurethanes, polyepoxides, and blends of two or more polymers. Preferably used are vinyl polymers, polyesters, polycarbonates, polyamides, polyurethanes or polyepoxides.

The organoclay according to the invention is particularly suitable for use in thermoplastic polymers such as polyethylene, polypropylene, polystyrene, and acetal (co)polymers such as polyoxymethylene (POM), and in rubbers such as natural rubber (NR), styrene-butadiene rubber (SBR), polyisoprene (IR), polybutadiene (BR), polyisobutylene (IIR), halogenated polyisobutylene, butadiene nitrile rubber (NBR), hydrogenated butadiene nitrile (HNBR), styrene-isoprene-styrene (SIS) and similar styrenic block copolymers, poly(epichloro-hydrin) rubbers (CO, ECO, GPO), silicone rubbers (O), chloroprene rubber (CR), ethylene propylene rubber (EPM), ethylene propylene diene rubber (EPDM), polysulfide rubber (T), fluorine rubbers (FKM), ethylene vinyl acetate rubber (EVA), polyacrylic rubbers (ACM), polynorbornene (PNR), polyurethanes (AU/EU), and polyester/ether thermoplastic elastomers.

The amount of coated particles of the invention in the composite material is generally at least 0.01 wt %, preferably at least 0.05 wt %, and most preferably at least 0.1 wt %, and generally at most 75 wt %, preferably at most 50 wt %, and most preferably at most 30 wt %, based on the total weight of the composite material. Masterbatches of the composite material, i.e. highly concentrated additive premixes for, e.g., polymer compounding, are also contemplated. In such case, amounts of 10-70 wt %, more preferably of 10-50 wt % of the coated particles are used in a polymer matrix.

The composite material of the present invention can be prepared according to any method known to a person skilled in the art. A skilled person may intimately mix a polymer matrix and the coated particles according to the invention by using melt-blending techniques, for instance. This method is preferred, as it is simple, cost-effective, and readily applicable in existing plants. It is also envisaged to prepare the coated particles of the invention in the presence of the polymer matrix, or in the presence of the monomers and/or oligomers before, while or after the monomers and/or oligomers are polymerized to form the polymer matrix.

The present invention is further illustrated in the Examples below.

EXAMPLES

The following examples deal with the encapsulation of corrosion inhibitors such as benzotriazole (BT), dimethylolpropionic acid (DMPA) or salts of this acid with hydrotalcite (HTC-OH), hydrotalcite functionalized with lactic acid (HTC-LA) or carbonatohydrotalcite (HTC-$CO_3$).

Benzotriazole

Dimethylolpropionic acid

Encapsulation of Corrosion Inhibitors with Hydrotalcite by Spray-Drying at Laboratory Scale The hydrotalcite slurries used in the examples were synthesized according to WO 2002/068329, European patent application EP 07123964.4 (hydrotalcite functionalized with lactic acid), and WO2008034835A1 (hydrotalcite functionalized with carbonate).

Example 1

51 g of the corrosion inhibitor, benzotriazole ex Riedel-de Haën, assay >99%, were milled and added at room temperature to 200 g slurry of hydrotalcite functionalized with lactic acid with a solid content of 17%. The ratio hydrotalcite:benzotriazole is 40:60. The mixture was diluted with demi water to a solid content of 10% and milled with a Dispermat for one hour at 1,000 rpm. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 2

57 g of the corrosion inhibitor, benzotriazole ex Riedel-de Haën, assay >99%, were added to 865 g demi water and heated to 80° C. Then 500 g hydrotalcite slurry functionalized with lactic acid with a solid content of 17% were heated and slowly added to the corrosion inhibitor solution. The ratio hydrotalcite:—benzotriazole is 60:40. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 3

35.8 g of the corrosion inhibitor, benzotriazole ex Riedel-de Haën, assay >99%, were added to 657.1 g demi water and heated to 80° C. Then 500 g hydrotalcite slurry functionalized with lactic acid with a solid content of 17% were heated and slowly added to the corrosion inhibitor solution. The ratio hydrotalcite:—benzotriazole is 70:30. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 4

127.5 g of the corrosion inhibitor dimethylolpropionic acid/2,2-bis(hydroxy-methyl)propionic acid (ex Aldrich 98%) were milled and added at room temperature to 500 g slurry of hydrotalcite functionalized with lactic acid with a solid content of 17%. The ratio hydrotalcite:dimethylolpropionic acid is 40:60.

The mixture was diluted with demi water to a solid content of 10% and milled with a Dispermat for one hour at 1,000 rpm. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 5

127.5 g of the corrosion inhibitor dimethylolpropionic acid/2,2-bis(hydroxy-methyl)propionic acid (ex Aldrich 98%) were milled and neutralized with 38 g sodium hydroxide (ex Fluke assay >97%) in 100 g demi water. This mixture was added at room temperature to 500 g slurry of hydrotalcite functionalized with lactic acid with a solid content of 17%. The ratio hydrotalcite:dimethylolpropionic acid is 34:66. The mixture was diluted with demi water to a solid content of 10% and milled with a Dispermat for one hour at 1,000 rpm. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 6

142.0 g of the corrosion inhibitor dimethylolpropionic acid/2,2-bis(hydroxy-methyl)propionic acid (ex Aldrich 98%) were milled and neutralized with 42.3 g sodium hydroxide (ex Fluke assay >97%) in 100 g demi water. This mixture was added at room temperature to 500 g hydrotalcite slurry with a solid content of 18.9%. The ratio hydrotalcite:dimethylolpropionic acid is 34:66. The mixture was diluted with demi water to a solid content of 10% and milled with a Dispermat for one hour at 1,000 rpm. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 7

72 g of the corrosion inhibitor, benzotriazole ex Riedel-de Haën, assay >99%, were milled and added at room temperature to 500 g slurry of carbonato-hydrotalcite with a solid content of 9.6%. The ratio hydrotalcite:benzotriazole is 40:60. The mixture was diluted with demi water to a solid content of 10% and milled with a Dispermat for one hour at 1,000 rpm. Then the mixture was spray-dried on a Büchi mini spray drier.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 8

60 g sulfur were added to 180 g of hydrotalcite functionalized with lactic acid (s.c.=16.5%) and 300 g demi water. Then the mixture was spray-dried on a Büchi mini spray drier. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles.

Encapsulation of Corrosion Inhibitors with Hydrotalcite by Spray-Drying, Scale Up Example 9

504.4 g of the corrosion inhibitor, benzotriazole ex Riedel-de Haën, assay >99%, were milled and added at room temperature to 2,000 g slurry of hydrotalcite functionalized with lactic acid with a solid content of 16.82%. The ratio hydrotalcite:benzotriazole is 40:60. The mixture was diluted with demi water to a solid content of 10% and milled with a Dispermat for one hour at 1,000 rpm. Then the mixture was spray-dried on a Mobile Minor™ '2000' Type "D" (Niro).

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 10

To 580.52 g of the corrosion inhibitor, benzotriazole ex Riedel-de Haën, assay >99%, were added 5 liters of demi water and the mixture was heated at 80° C. 2,330 g of heated slurry of hydrotalcite functionalized with lactic acid with a solid content of 16.61% were added slowly to the mixture. The ratio hydrotalcite:—benzotriazole is 40:60. The heated (80° C.) mixture was milled with a Dispermat and spray-dried on a Mobile Minor™ '2000' Type "D" (Niro).

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Encapsulation of Benzotriazole Via Pickering Emulsion

For these experiments a stock slurry of carbonate-HTC was made. To make this slurry 191.2 grams of MgO and 169.0 grams of ATH were mixed in 1,000 grams of demi water and ground to an average particle size ($d_{50}$) of 2.6 μm. The slurry was fed to an oil-heated autoclave equipped with a high-speed stirrer. The reactor was heated to 145° C. and at that point a $CO_2$ pressure of 8 bars was applied to the reactor for four hours. The reactor was cooled down to 80° C. and the product was drawn off. The product had an average particle size ($d_{50}$) of 4.0 μm and a solid content of 26.5%. The product was analyzed with X-ray diffraction and pictures were taken with scanning electron microscopy. The stock slurry was used to make carbonate-HTC/benzotriazole particles in different ratios.

Example 11

280 grams of the stock dispersion of carbonato-HTC and 25.2 grams of Benzotriazole ex Riedel-de Haën, assay >99%, were mixed in 700 grams of demi water (ratio HTC/BT is 75/25). The slurry was fed to an oil-heated autoclave equipped with a high-speed stirrer. The reactor was heated at 110° C. for one hour. Then the reactor was cooled down to 80° C. and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 12

210 grams of the stock dispersion of carbonato-HTC and 55.6 grams of Benzotriazole ex Riedel-de Haën, assay >99%, were mixed in 846.4 grams of demineralized water (ratio HTC/BT is 50/50). The slurry was fed to an oil-heated autoclave equipped with a high-speed stirrer. The reactor was heated at 110° C. for one hour. Then the reactor was cooled down to 80° C. and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 13

666.7 g of a stock dispersion (S.C.=9.76%) of hydrotalcite functionalized with carbonate were mixed with 21.7 g of benzotriazole ex Riedel-de Haën, assay >99% (ratio HTC/BT is 75/25). The mixture was fed to an oil-heated autoclave equipped with a high-speed stirrer. The reactor was heated at 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 14

666.7 g of a stock dispersion (S.C.=9.76%) of hydrotalcite functionalized with carbonate were mixed with 65.07 g of benzotriazole ex Riedel-de Haën, assay >99% (ratio HTC/BT is 50/50). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried.

The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 15

590 g of a stock dispersion (S.C.=9.76%) of hydrotalcite functionalized with carbonate were mixed with 37.28 g of benzotriazole ex Riedel-de Haën, assay >99% (ratio HTC/BT is 60/40). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 16

500 g of a stock dispersion (S.C.=8.78%) of hydrotalcite functionalized with carbonate were mixed with 87.8 g of mercaptobenzothiazole ex Riedel-de Haën, assay >99% (ratio HTC/MBT is 75/25). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 17

1,000 g of a stock dispersion (S.C.=10.57%) of hydrotalcite functionalized with carbonate and 2% stearic acid were mixed with 105.7 g of benzotriazole ex Riedel-de Haën, assay >99% (ratio HTC/BT is 50/50). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 18

782.85 g of a stock dispersion (S.C.=10.57%) of hydrotalcite functionalized with carbonate and 2% stearic acid were mixed with 55.16 g of benzotriazole ex Riedel-de Haën, assay >99% (ratio HTC/BT is 60/40). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 19

1,000 g of a stock dispersion (S.C.=10.57%) of hydrotalcite functionalized with carbonate and 2% stearic acid were mixed with 35.23 g of benzotriazole ex Riedel-de Haën, assay >99% (ratio HTC/BT is 75/25). The mixture was fed to an oil-heated autoclave equipped with a high-speed stirrer. The reactor was heated to 110° C. for 30 minutes with a stirrer speed of 1,000 rpm. Then the reactor was cooled down in 45 minutes to 50° C. with a stirrer speed of 100 rpm and the product was drawn off. After this the product could be spin-dried or filtrated and dried. The resulting product was analyzed by scanning electron microscopy to determine the particle size, which was smaller than 20 μm. The scanning electron microscopy pictures show that the particles were spherical and had the same size. Further, it was seen in the scanning electron microscopy pictures that the product did not contain free inhibitor crystals. X-ray diffraction was performed to determine that the product was situated inside the particles. Thermographic analyses were performed to determine the amount of inhibitor in the samples using a calibration line. The material was embedded in an epoxy resin and the inhibitor inside the particles was demonstrated by secondary ion mass spectrometry.

Example 20

200 g hydrotalcite functionalized with lactic acid (S.C.=16%) were mixed with 32 g sulfur and 500 ml demineralized water. A 1 liter autoclave was loaded with HTC-LA, then the sulfur/water mixture was added and the autoclave was heated at 135° C. and stirred at 400 rpm for 45 minutes, then heated at 135° C. and stirred at 1,200 rpm for 15 minutes. Then the mixture was cooled down and the sample was tapped (grey/green very fine material), filtrated, dried, and milled in the blender. In the XRD spectrum it was seen that the product contained peaks of hydrotalcite and many other sharp peaks of sulfur.

Fluid Bed Encapsulation

Example 21

A mixture was prepared of 50 wt % demineralized water and 50% of PVP polymer (Luvitec VPC 55K65V ex BASF). About 200 g of a GLDA powder (ex AkzoNobel Functional Chemicals) was put into a lab scale fluid bed (make Aeromatic Strea-1). The liquid PVP solution was sprayed onto the GLDA powder while the powder was fluidized with air at an air inlet temperature of about 60° C. The spray set-up was a so-called Würster set-up, where the spray nozzle is fitted in the base plate, resulting in a spray pattern that is concurrent with the air feed. Powder is forced upwards through a centrally placed pipe. The coating liquid is sprayed onto the powder via the spray nozzle. This gives an even distribution of the coating liquid onto the powder. The PVP mixture was added to 200 grams of GLDA in a first portion until a total amount of about 53 grams had been added to the powder. In the second step, 145 g of this coated powder were again coated with 50/50 PVP/water mixture until a total amount of 41.6 g of coating liquid had been sprayed on. This gave a total coating level of about 21 wt % on solids basis.

Example 22

About 200 g of a GLDA powder (ex AkzoNobel Functional Chemicals) were put into a lab scale fluid bed (make Aeromatic Strea-1). As coating liquid, a HTC-LA slurry was used, diluted with demineralized water at weight ratio of 50/50. The HTC-LA slurry contained 17% solids consisting of 10% HTC and 7% LA. The coating liquid was sprayed onto the GLDA powder while the powder was fluidized with air at an air inlet temperature of about 60° C. The coating liquid was sprayed onto the powder via a nozzle, said nozzle being positioned above the moving fluid bed. This gave an even distribution of the coating liquid onto the powder. A total of 289 g of coating liquid was sprayed onto the GLDA powder while simultaneously fluidizing and drying by air. This gave a coating level of about 10 wt %. A powder sample was taken at this point. Spray-on was continued until 560 g had been sprayed on. This gave a coating level of about 19 wt %.

Example 23

To determine the moisture uptake of coated and uncoated GLDA powders, 5 g of the powder were put into a climate chamber in which the air was kept at a temperature of 20° C. and a relative humidity of 50%. The weight increase was monitored as a function of time. To determine the rate of moisture uptake, the time that it took to get from a 5 wt % increase to a 10 wt % increase (Δt (5 wt %→10 wt %)) was noted. The table below shows this Δt-value. The shorter this time, the more hygroscopic the powder.

| Sample | Δt (5 wt % → 10 wt %) [minutes] |
| --- | --- |
| Reference (GLDA uncoated) | 70 |
| GLDA + PVP (21 wt %) | 135 |
| GLDA + HTC-LA (10 wt %) | 199 |
| GLDA + HTC-LA (19 wt %) | 245 |

This shows that the HTC-LA 19 wt % coated powder gave the slowest moisture uptake of all systems. It also shows that compared to the 21 wt % PVP coated powder, the HTC-LA powder with only 10 wt % coating gave a reduced moisture uptake.

Example 24

To determine the moisture uptake of coated and uncoated GLDA powders, 5 g of the powders were put into a climate chamber in which the air was kept at a temperature of 20° C. and a relative humidity of 50%. The powders were removed from the climate chamber and visually evaluated after 30 minutes at these conditions. The powders tested were GLDA as is (as reference), GLDA with 21 wt % PVP and GLDA with 19 wt % HTC-LA. It was found that only the HTC-LA-coated powder remained a free flowing, non-sticky powder.

Example 25

200 g sulfur was covered with 178.3 g hydrotalcite functionalized with lactic acid (S.C.=8.5%). First the hydrotalcite was humidified without airflow. Then the pressure on the nozzle was put at 1 bar and the airflow was 5%. The temperature of the product was 60° C.

The invention claimed is:

1. A coated particle comprising a core material and a shell and wherein said core material is an organic compound selected from the group consisting of chelating agents, said organic compound not being a polymer, and wherein said shell comprises a layered double hydroxide having a layered structure corresponding to the general formula:

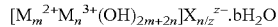

$$[M_m^{2+}M_n^{3+}(OH)_{2m+2n}]X_{n/z}^{z-}\cdot bH_2O$$

wherein $M^{2+}$ is a divalent metal ion selected from the group consisting of $Zn^{2+}$, $Mn^{2+}$, $Ni^{2+}$, $Co^{2+}$, $Fe^{2+}$, $Cu^{2+}$, $Sn^{2+}$, $Ba^{2+}$, $Ca^{2+}$, and $Mg^{2+}$; $M^{3+}$ is a trivalent metal ion selected from the group consisting of $Al^{3+}$, $Cr^{3+}$, $Fe^{3+}$, $Co^{3+}$, $Mn^{3+}$, $Ni^{3+}$, $Ce^{3+}$, and $Ga^{3+}$; m and n have a value such that m/n=1 to 10; b has a value in the range of from 0 to 10; and X is hydroxide or an organic charge-balancing anion which is a linear or branched, saturated or unsaturated $C_1$-$C_{18}$ alkyl chain optionally comprising one or more functionalities selected from the group consisting of carboxylic acid, hydroxyl, thiol, and amine, and optionally comprising a functional group on the alkyl chain selected from the group consisting of ester, ether, chloride, bromide, thioether, sulfonium, phosphonium, phosphinic, and isocyanate, and Z being the number of charge of said anion X.

2. The coated particle according to claim 1 wherein X is an organic charge-balancing anion which is a monocarboxylate selected from the group consisting of aliphatic glycolate, lactate, 3-hydroxypropanoate, α-hydroxybutyrate, β-hydroxybutyrate, γ-hydroxybutyrate, 2-hydroxy-2-methyl butyrate, 2-hydroxy-3-methyl butyrate, 2-ethyl-2-hydroxybutyrate, 2-hydroxycaproate, 2-hydroxyisocaproate, 10-hydroxydecanoate, 10-hydroxydodecanoate, dimethylol propionate, 4-hydroxyphenyl pyruvate, 3-fluoro-4-hydroxyphenyl acetate, 3-chloro-4-hydroxyphenyl acetate, homo-vanillate, 3-hydroxy-4-methoxymandelate, DL-3,4-dihydroxymandelate, 2,5-dihydroxyphenylacetate, 3,4-dihydroxyphenyl acetate, 3,4-dihydroxyhydrocinnamate, 4-hydroxy-3-nitrophenyl acetate, 2-hydroxycinnamate, salicylate, 4-hydroxybenzoate, 2,3-dihydroxybenzoate, 2,6-dihydroxybenzoate, 3-hydroxyanthranilate, 3-hydroxy-4-methyl benzoate, 4-methyl salicylate, 5-methyl salicylate, 5-chlorosalicylate, 4-chlorosalicylate, 5-iodosalicylate, 5-bromosalicylate, 4-hydroxy-3-methoxybenzoate, 3-hydroxy-4-methoxybenzoate, 3,4-dihydroxybenzoate, 2,5-dihydroxybenzoate, 2,4-dihydroxybenzoate, 3,5-dihydroxybenzoate, 2,3,4-trihydroxybenzoate, gallate, and syringate.

3. The coated particle according to claim 1 wherein the core material is selected from the group consisting of glutamic acid diacetic acid (GLDA), or its tetrasodium salt, and methylglycine diacetic acid (MGDA).

4. A suspension comprising the coated particle of claim 3 and a continuous phase in which the coated particle does not dissolve.

5. The coated particle according to claim 1, wherein the amount of layered double hydroxide is between 5 and 70 wt %, based on the total weight of the coated particle.

6. The coated particle according to claim 5, wherein the amount of layered double hydroxide is between 20 and 50 wt %, based on the total weight of the coated particle.

7. A process to prepare the coated particle according to claim 1, comprising the steps of:
(a) providing a mixture of a compound to be encapsulated and a solvent;
(b) heating and stirring the resulting mixture;
(c) cooling the mixture and separating the particles from the mixture;
(d) drying the mixture, below the melting point of the mixture, to obtain the coated particle according to claim 1;
wherein the layered double hydroxide is added to the mixture during step (a) and/or step (b).

8. A process to prepare the coated particle according to claim 1, comprising the steps of:
(a) providing a mixture of a compound to be encapsulated and a solvent;
(b) optionally heating and stirring the mixture;
(c) spray-drying the mixture, below the melting point of the mixture, to obtain the coated particle according to claim 1;
wherein the layered double hydroxide is added to the mixture during step (a) and/or step (b).

9. A process to prepare the coated particle according to claim 1, comprising the following steps:
(a) a compound to be encapsulated in the form of a powder is fluidized with air at an air inlet temperature below the melting temperature of the powder;
(b) a coating liquid comprising the layered double hydroxide is sprayed onto the powder via a nozzle.

10. A suspension comprising the coated particle of claim 1 and a continuous phase in which the coated particle does not dissolve.

11. A composite material comprising a polymeric matrix and the coated particle according to claim 1.

12. A process to prepare the coated particle of claim 1, comprising encapsulating said organic compound with said layered double hydroxide.

13. The coated particle according to claim 1, wherein the amount of layered double hydroxide is between 20 and 50 wt %, based on the total weight of the coated particle.

14. A composite material comprising a polymeric matrix and the coated particle according to claim 1.

* * * * *